United States Patent [19]

Wupper et al.

[11] Patent Number: 5,265,947
[45] Date of Patent: Nov. 30, 1993

[54] CIRCUIT CONFIGURATION FOR A BRAKE SYSTEM HAVING AN ANTI-LOCK CONTROL

[76] Inventors: Hans Wupper, Eichaeckerstrasse 10A, 6000 Frankfurt am Main 60; Helmut Fennel, Schubertstrasse 9, 6232 Bad Soden; Gunther Buschmann, Georg-Buechner-Strasse 15, 6103 Griesheim; Ivica Batistic, Rossdorfer Strasse 18, 6000 Frankfurt am Main 60; Norbert Ehmer, Kanalstrasse 4, 6482 Bad Orb; Robert Schmidt, Bahnhofstrasse 14, 5439 Pennerod, all of Fed. Rep. of Germany

[21] Appl. No.: 730,936
[22] PCT Filed: Jan. 10, 1990
[86] PCT No.: PCT/EP90/00046
   § 371 Date: Jul. 30, 1991
   § 102(e) Date: Jul. 30, 1991
[87] PCT Pub. No.: WO90/08681
   PCT Pub. Date: Aug. 9, 1990

[30] Foreign Application Priority Data

Feb. 3, 1989 [DE] Fed. Rep. of Germany ....... 3903180

[51] Int. Cl.$^5$ .................................................. B60T 8/00
[52] U.S. Cl. .............................. 303/100; 303/DIG. 4
[58] Field of Search ......... 303/100, 103, 110, DIG. 1, 303/DIG. 2, DIG. 4; 364/426.02

[56] References Cited

U.S. PATENT DOCUMENTS

| | | | |
|---|---|---|---|
| 4,585,280 | 4/1986 | Leiber | 303/100 |
| 4,921,314 | 5/1990 | Braschel et al. | 303/110 |
| 4,923,255 | 5/1990 | Braschel et al. | 303/100 X |
| 4,930,845 | 6/1990 | Bleckmann et al. | 303/100 |
| 4,938,544 | 7/1990 | Braschel et al. | 303/103 |
| 4,985,839 | 1/1991 | Dominke | 303/103 X |
| 5,033,799 | 7/1991 | Braschel | 303/100 X |

FOREIGN PATENT DOCUMENTS 0298498 1/1989 European Pat. Off. .

Primary Examiner—Robert J. Oberleitner
Assistant Examiner—Josie A. Ballato
Attorney, Agent, or Firm—Robert P. Seitter; J. Gordon Lewis

[57] ABSTRACT

The circuit configuration for a brake system having an anti-locking control generates pulse-type brake pressure control signals. For pressure rebuild-up after a pressure decrease, brake pressure is applied first at a steep and subsequently at a flatter gradient, this being achieved by a variable pulse (P1) and by short fixed pulses (P2) succeeding one another at a large interval. Circuits are provided rendering dependent the pulse and pulse break times ($T_1$, $T_2$, $T_k$) determining the pressure build-up on the duration of the pressure build-up ($T_1$) during the steep-rise build-up in the preceding cycle, on the duration ($T_1 + nT_2$) of the entire pressure build-up in the preceding cycle, and on the duration ($T_o$) of the preceding pressure decrease, with the pulse times being so dimensioned that, at a constant coefficient of friction and at a constant static pressure, the locking limit of the wheel is rereached after a predetermined period of time or after a predetermined pulse number. The duration of the variable and of the fixed pressure build-up pulses is computed from the pressure build-up of the preceding pressure or determined from a stored Table.

16 Claims, 2 Drawing Sheets

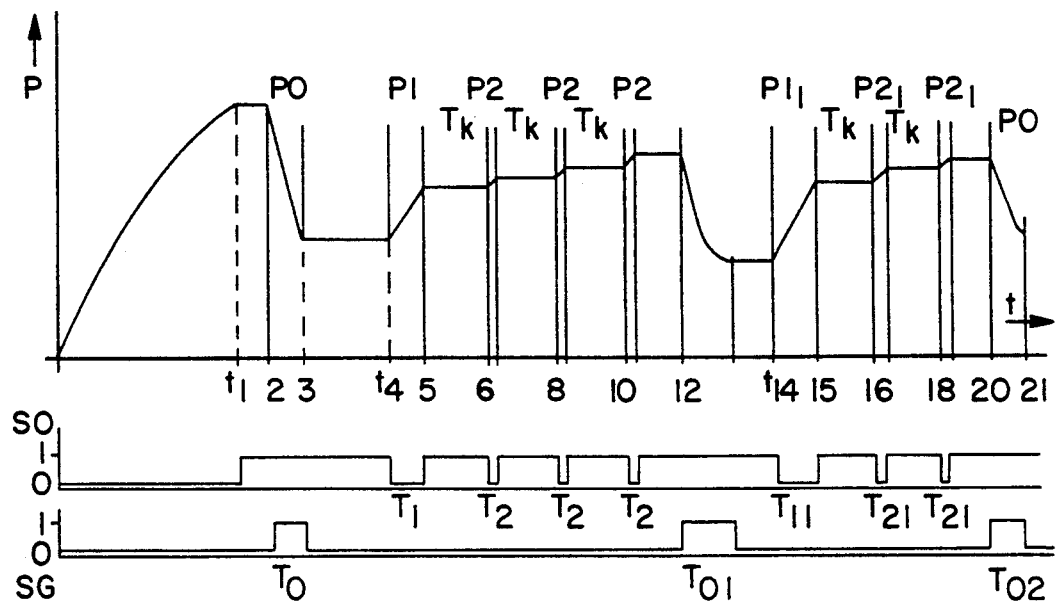

CIRCUIT CONFIGURATION FOR A BRAKE SYSTEM HAVING AN ANTI-LOCK CONTROL

BACKGROUND OF THE INVENTION

The present invention relates to a circuit configuration for a brake system having an anti-locking control for controlling the pressure build-up upon commencement of the control by generating pulse-type control signals capable to control multi-way valves that are inserted into pressure-fluid conduits leading to the wheel brakes, with the pressure, by dimensioning the pulse and pulse break times, being applicable first at a steep and then at a flatter gradient, and with the pressure build-up, in the first cycle after commencement of the control, being dependent on the preceding pressure drop and, in the other cycles, on the pressure increase in the preceding cycles.

A circuit configuration of the afore-described type has already been taught by DE-Patent 24 60 904 according to which the brake pressure, basically, during anti-locking control, first, is reincreased at a steep and, subsequently, at a flatter gradient. The steep pressure increase, preferably, is attained by an extended pulse while the flatter increase is attained by a short pulse which two pulses succeed one another at a relatively large interval, with the duration of the steep-gradient pressure rise being varied in response to the pressure build-up in the preceding control cycle(s). For dimensioning the steep phase of the first control cycle in respect of which there is no precedingly controlled pressure build-up, the level and duration, respectively, of the preceding brake pressure decrease will be taken into account.

According to European Patent Application No. 177 817, equally concerned with the pressure reincrease first at a steep and subsequently at a flatter gradient, it is known to render dependent the pressure level of the first pressure build-up pulse determining the phase of the steep pressure rise, in addition, on a quotient resulting from the maximum wheel acceleration divided by the sum of the amounts of maximum wheel acceleration and maximum wheel deceleration. In one example, the pressure level of the first pressure build-up pulse corresponds to the preceding pressure decrease multiplied by the above-mentioned quotient and a factor approximately "1".

SUMMARY OF THE INVENTION

A brake pressure control according to the foregoing will not, in all cases, bring about satisfactory results. It is, therefore, an object of the present invention to adjust, for attaining an improved control, the brake pressure rebuild-up even more precisely to the respective situation and the respective conditions to insure, on the one hand, a continued driving stability and, on the other hand, a short stopping distance through attaining, at an early stage, the anti-locking pressure level during the individual control cycles.

It has been found that this problem can be solved by a circuit configuration of the type described above, the special feature of which resides in that circuits are provided rendering dependent the pulse and pulse break times determining the pressure build-up, in the cycles following the first cycle, on the duration of the pressure build-up or the number of the pressure build-up pulses during the steep-gradient pressure build-up in the preceding cycle, on the duration of the entire pressure build-up phase of the preceding cycle and on the duration of the preceding pressure decrease, with the pulse times and especially the duration of the pressure increase in the steep-gradient phase being so dimensioned that at an approximately constant friction value and friction coefficient, respectively, and at an approximately constant static pressure, the locking limit of the wheel is rereached after a predetermined period of time and a predetermined number of pulses.

Static pressure in this context means the brake pressure in the master cylinder dependent on the level of force applied by the driver to the brake pedal.

If the constant frictional coefficient requirement is not complied with, the locking limit is rereached sooner or only after a major number of "fixed" pulses, i.e. short pulses succeeding one another at a "fixed" interval.

The circuit according to the present invention, under all road conditions, insures a rapid approach of the pressure to the optimum pressure level thereby precluding deceleration at an excessively low rate, especially under unfavorable conditions, and attaining a short stopping distance.

According to an advantageous form of the present invention, the steep-gradient pressure build-up is attainable by a variable pulse while the flat-gradient pressure build-up is attainable by "fixed" pulses that are relatively short pulses of a constant duration following one another at a constant interval. It is particularly advantageous to maintain, according to another form of the present invention, the duration of these so-called "fixed" pulses in proportion to the duration of the variable pulses and the duration of the steep pressure rise, respectively.

The predetermined pulse number after which the wheel will rereach the locking limit, advantageously, including the variable pulse, is between three and five, preferably three pulses. Alternatively, it is also possible for the pulse times to be so dimensioned that a control frequency of about 3 to 10 Hz, preferably 3 to 5 Hz, is adjusted.

According to another form of the present invention, the duration of the steep-gradient pressure rise can be determined in response to the number of the pulses or the duration of the steep pressure rise in the preceding cycle and in response to the entire pressure build-up phase or the entire number of pulses according to computed or tabulized values. Also, it will be possible for the calculation to be based on the number of the pulses of the flat-gradient pressure build-up phase in place of the entire number of pulses.

In a variety of cases, it is of advantage to adjust the value for dimensioning the steep pressure rise computed or determined from the stored Table, under consideration of the preceding pressure decrease, and to reduce or raise the same to a predetermined maximum or to a predetermined minimum value, respectively, in relation to the duration of the pressure decrease. The maximum value can be fixed to a predetermined value in the range between 40% and 60% while the minimum value can be fixed to a predetermined value in the range between 10% and 30% of the duration of he preceding pressure decrease.

According to one form of the present invention, the determined value of the steep pressure increase is not raised upon reaching of the minimum value once the instantaneous frictional value is low (low frictional value).

After raising of the steep pressure rise to the minimum value, there will be no renewed raising in the following control cycles as long as the duration of the pressure rise or the number of the pressure build-up pulses does not exceed a predetermined limit value of e.g. two pulses per control cycle.

According to another form of the circuit configuration of the present invention, the duration of the steep pressure rise computed or determined from the Table can be raised in response to the previously measured reacceleration if the same exceeds predetermined threshold values.

According to another form of the present invention, the pressure build-up can already be initiated once the reacceleration exceeds a predetermined threshold value in the range between 10 and 20 g, e.g. 12 to 15 g if, in the preceding cycle, the duration of the pressure decrease was relatively extended and was above a predetermined threshold value, respectively.

Further features, advantages and fields of application of the invention will become apparent from the following description with reference to the enclosed circuit configuration, the diagrams and the Table concerned with forms of the present invention.

BRIEF DESCRIPTION OF THE DRAWINGS

FIG. 2 is a diagrammatic view of the pressure pattern during an anti-locking control, and of the corresponding valve pulses, and FIG. 3 shows a Table for determining the duration of the steep pressure rise in response to values in the preceding cycle, which Table can be stored in the circuit configuration according to FIG. 1.

DETAILED DESCRIPTION OF THE INVENTION

Figure 1:
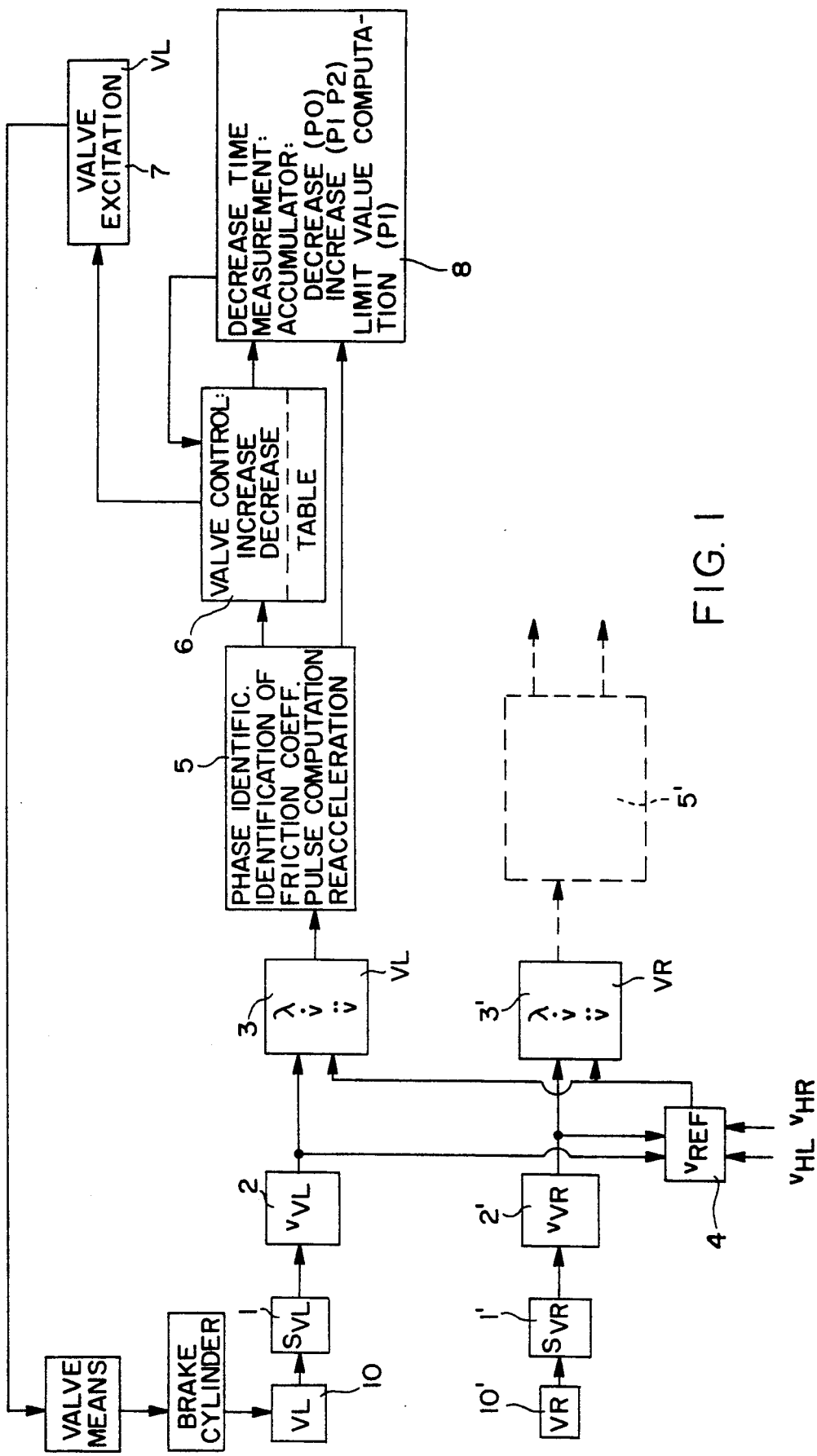
FIG. 1 is a block diagram of a circuit configuration according to the present invention.

FIG. 1 shows the major electronic components of a circuit configuration according to the invention for a control channel, viz. the control channel of the left-hand front wheel VL. Some of the control channel of the right-hand font wheel VR is shown. For the sake of clarity, similar control channels for the rear wheels HL and HR have been omitted from FIG. 1.

As shown in FIG. 1, in the example illustrated, the rotating pattern of wheels VL, VR (10, 10') measured with the aid of wheel sensors 1,1' ($S_{VL}$, $S_{VR}$) In a following circuit 2 (2'), respectively a speed signal $v_{VL}$ ($v_{VR}$) suitable for further processing is obtained. In another circuit 3 (3'), the instantaneous slip lambda, the acceleration or deceleration ($\dot{v}$), the jerk ($\ddot{v}$), in known manner, are measured from this signal, individually for each wheel under consideration of a vehicle reference speed $v_{REF}$.

To form this vehicle reference speed $v_{REF}$, which is known to serve as a reference quantity for rating the instantaneous rotating pattern of the individual wheels, all wheel speed signals $v_{VL}$, $v_{VR}$, $v_{HL}$ and $v_{HR}$, in a circuit 4, are logically combined and analyzed by special criteria. The starting signal of circuit 4, viz. the $v_{REF}$ signal, is then supplied to the individual circuits 3,3' since it is needed, among others, for determining the slip lambda.

The processed sensor signals are analyzed in a control logic 5 (5'), with a so-called phase identification occurring to determine whether the wheel run is stable, a locking tendency has occurred, reacceleration is effected etc. Also, conclusions are drawn from the analysis of known criteria as to the instantaneous coefficient of friction and road conditions, respectively; in this respect, the coefficient of friction identification is relied upon. Under consideration of this information, finally, the pulse control signals are computed (pulse computation), through which the brake pressure increase and decrease of the desired brake pressure pattern in the wheel brakes of the individual wheels is to be controlled.

The control logic 5 (5'), in addition, is provided with a "reacceleration" circuit branch supplying signals once the reacceleration of the wheel VL (VR) exceeds predetermined peak values. As explained in greater detail hereinafter, the steep pressure increase phase is additionally prolonged at a particularly high reacceleration.

For the valve control, an additional circuit 6 is provided through which the pulse signals computed in the control logic 5 are modified, and by which, in response to additional criteria, the actual valve-exciting signals are generated which, virtually, are fed to a final phase 7, viz. the "valve excitation".

These criteria, determined with the aid of a circuit 8 and considered by the valve control 6 in fixing the valve exciting signals, among others, are derived from the measurement of the pressure decrease and the corresponding pulse times in the preceding control cycle, respectively, from stored data on pressure decrease and pressure increase in the preceding cycle and, finally, from predetermined threshold values for the duration of the steep pressure increase phase. This will be explained in greater detail hereinafter with reference to FIGS. 2 and 3.

Sensor 1,1' may be, for example, an inductive transducer having a passive or active measuring circuit generating a signal the frequency of which is in proportion to the speed. The rest of the components of the schematic circuit according to FIG. 1, basically, can be realized by firmly wired or program-controlled circuits, preferably using microcomputers.

FIG. 2 shows the brake pressure pattern within a wheel brake during a controlled brake operation, using the circuit configuration according to the invention. The brake pressure control signals (i.e. pulse trains) insuring this pressure pattern, are also shown therein. Designated by SG (closed in de-energized condition) are those pulses that energize the brake pressure decreasing valve, whereas SO (open in de-energized condition) refers to the switching position of the so-called inlet valve which, normally, is introduced into the pressure fluid conduit leading from the brake pressure generator to the wheel brake. In de-energized condition, the SO-valve is switched to the passage position. The valves are not shown therein.

In the operation herein described, the anti-locking control operation will commence at time $t_1$. The SO-valve will be reswitched to the blocking position. By energizing the SG-valve during the time from $t_2$ to $t_3$, the brake pressure is decreased followed up to $t_4$ by a phase of keeping the pressure constant, wherein both valves SO and SG are closed. Once the wheel has re-entered a stable phase, the pressure is reincreased, first at a steep gradient during the period of time between $t_4$ and $T_5$ (the duration of pulse P1 is $T_1$) and, subsequently, at a flat gradient (from $t_5$ to the end of pulse P2 at $t_6$) which is achieved by a short valve opening pulse P2 succeeding one another at a relatively large distance $T_k$. During the time $T_k$ both valves SG and SO, again are switched to the blocking position, with the pressure fluid conduit passing therethrough being closed. The duration $T_1$ of pulse P1 is computed by the control electronic unit and is variable, whereas the short pulses P2 presently are designated as "fixed" pulses because the pulse interval $T_K$ as well as duration $T_2$ in a multiplicity of cases are constant. However, according to an advantageous form of the present invention, the pulse duration $T_2$ is adjusted to the duration $T_1$ of the variable pulse P1. $T_2$ in that case is always in proportion or approximately in proportion to $T_1$.

In the control cycle commencing at $t_4$, the duration of the steep pulse P1 is determined in response to the duration $T_0$ of the pressure decrease. In the control cycle commencing at $t_{14}$ and in all following control cycles, the first pulse and the variable pulse P1$_1$ respectively, orients itself by the preceding process of pressure increase, with duration $T_{11}$ of pulse P1$_1$ being so computed by the circuit configuration according to FIG. 1 as to enable the controlled wheel, at a constant coefficient of friction and at a constant static pressure, to re-reach the stability limit after three pulses, the variable pulse included. Hence, the brake pressure, in a defined time, is again approximated to the optimum value, thereby precluding deceleration at an excessively low rate (which would result in an excessively slow pressure build-up) and adjusting a predetermined control frequency of, for example, 3 to 5 Hz.

In the present instance, the steep pressure increase is attained by a single variable pulse. The duration $T_{11}$ of this pulse in the second control cycle (and in the following cycles) is computed from the duration $T_1$ of the steep pressure rise and the variable pulse P1 of the preceding control cycle, respectively, and from the overall duration of the pressure buildup in the preceding control cycle, i.e. from pulse P1 and the total number of the fixed pulses P2. It is of special advantage if predetermined quantities can be relied upon for determining the duration of this variable pulse P1$_1$, that are stored, in the control circuit, e.g. in the valve control 6 according to FIG. 1. Using microcomputers, by such tabular access, the program duration will be reduced and the storage location requirements minimized. FIG. 3, by way of example, shows an abstract from such a Table. The numerals identify the units of time. The top row indicates the number of fixed pulses P2$_{n-1}$ in the preceding control cycle, whereas the first column, P1$_{n-1}$ refers to the duration of the preceding variable pulse.

The duration of pulse P1$_n$, hence, is directly conveyed by the matrix. According to one example of embodiment, the units of the Table were about 1 to 1.2 msec.

The value P1$_n$ computed or taken from the Table, moreover, is dependent on the pressure decrease in the preceding cycle. Circuit 8 causes the variable pulse P1$_1$ to have at least a predetermined length as compared to the length of the preceding pressure decrease, e.g. at least 20% of the pressure decrease duration $T_{01}$. The maximum duration of the variable pulse P1, equally, is fixed by circuit 8. The maximum length and duration, respectively, of pulse P1 is limited to a predetermined value in relation to the duration of the pressure decrease $T_0$, e.g. to about 50% of the preceding pressure decreasing pulse.

This adjustment of or rise in the duration of the variable pulse P1 through the threshold calculation in circuit 8 to the minimum value of e.g. 20% of the preceding pressure decreasing pulse is, however, rendered ineffective once the frictional value identification in the control logic 5 indicates a low friction value.

Moreover, the described embodiment of the invention provides blocking after a rise in the pressure build-up and the variable pulse P1, respectively, to the minimum value, a renewed rise therein for one or more cycles as long as occurrence of a predetermined number of build-up pulses in the pressure build-up phases is not exceeded: such ban on a rise in the pressure build-up is lifted, for example, if more than two build-up pulses are computed in one cycle.

In addition, according to another embodiment of the invention, the duration $T_{1n}$ of the variable pulse P1$_n$ may be influenced in response to the reacceleration to which the corresponding wheel of the vehicle was exposed in the preceding cycle. If such a reacceleration exceeds predetermined peak values, the duration of the variable pulse P1$_n$ is increased by predetermined units of time.

According to one embodiment of the invention, the pressure rebuild-up is initiated before the wheel has re-entered its stable phase. For this purpose, the reacceleration again, is measured. Once it exceeds a predetermined threshold value which may be between 10 and 20 g, and once the pressure decrease in the preceding cycle was relatively extended, pressure is applied immediately, i.e. upon reaching of the reacceleration threshold, through one or several pulses. Once the wheel has then rereached its stability limit, the pressure build-up is continued.

Consideration can also be given to additional criteria in the computation of the pressure build-up and in the length of the variable pulse P1, to take into account special conditions such as cornering, trouble, atypical wheel rotating pattern etc.

What is claimed:

1. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:
  (a) a locking limit at which said wheel tends to lock, and
  (b) acceleration of said wheel;

means adapted for supplying:
  (a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and
  (b) pressure increase pulse trains to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having a first pulse and succeeding pulses;

and means for controlling the durations, numbers, and spacings of said pulses of said pressure increase pulse trains according to the following:

(a) for an initial pressure increase pulse train, dependent upon that pressure decrease preceding said initial pressure increase pulse train, (b) for a particular pressure increase pulse train following said initial pressure increase pulse train, dependent upon that pressure increase preceding said particular pressure increase pulse train, (c) each said first pulse of said pressure increase pulse trains having a duration which is dependent upon the duration of said preceding pressure decrease and:

(1) the maximum duration of each said first pulse of said pressure increase pulse trains is fixed between forty percent and sixty percent of said duration of said preceding pressure decrease, and (2) the minimum duration of each said first pulse of said pressure increase pulse trains is fixed between ten percent and thirty percent of said duration of said preceding pressure decrease, and (d) at an approximately constant coefficient of friction and at an approximately constant static pressure, said locking limit of said wheel is reached after a predetermined period of time.

2. A circuit according to claim 1 wherein increasing the duration of said first pulse in each of said pulse trains is precluded when the duration falls below a predetermined minimum value for a low instantaneous coefficient of friction.

3. A circuit according to claim 1 wherein after the duration of the first pulse in each of said pulse trains is raised to a minimum value, in subsequent pressure increases, renewed pressure increase is precluded if the duration of the pressure increase does not exceed a predetermined threshold.

4. A circuit according to claim 1 wherein after the duration of the first pulse in each of said pulse trains is raised to a minimum value, in subsequent pressure increases, renewed pressure increase is precluded if the number of pulses does not exceed a predetermined threshold.

5. A circuit for controlling an anti-lock baking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:

(a) a locking limit at which said wheel tends to lock, and (b) acceleration of said wheel;

means adapted for supplying:

(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and (b) pressure increase pulse trains to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having a first pulse and succeeding pulses;

and means for controlling the durations, numbers, and spacings of said pulses of said pressure increase pulse trains according to the following:

(a) for an initial pressure increase pulse train, dependent upon that pressure decrease preceding said initial pressure increase pulse train, (b) for a particular pressure increase pulse train following said initial pressure increase pulse train, dependent upon that pressure increase preceding said particular pressure increase pulse train, (c) each said first pulse of said pressure increase pulse trains having a duration which is dependent upon the duration of said preceding pressure decrease and:

(1) the maximum duration of each said first pulse of said pressure increase pulse trains is fixed between forty percent and sixty percent of said duration of said preceding pressure decrease, and (2) the minimum duration of each said first pulse of said pressure increase pulse trains is fixed between ten percent and thirty percent of said duration of said preceding pressure decrease, and (d) at an approximately constant coefficient of friction and at an approximately constant static pressure, said locking limit of said wheel is reached after a predetermined number of pulses of said pressure increase pulse trains.

6. A circuit according to claim 5 wherein increasing the duration of said first pulse in each of said pulse trains is precluded when the duration falls below a predetermined minimum value for a low instantaneous coefficient of friction.

7. A circuit according to claim 5 wherein after the duration of the first pulse in each of said pulse trains is raised to a minimum value, in subsequent pressure increases, renewed pressure increase is precluded if the duration of the pressure increase does not exceed a predetermined threshold.

8. A circuit according to claim 5 wherein after the duration of the first pulse in each of said pulse trains is raised to a minimum value, in subsequent pressure increases, renewed pressure increase is precluded if the number of pulses does not exceed a predetermined threshold.

9. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:

(a) a locking limit at which said wheel tends to lock, and (b) acceleration of said wheel;

means adapted for supplying:

(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and (b) pressure increase pulse trains having a frequency between 3 Hz and 10 Hz to said inlet and outlet valve means to repetitively conduct fluid to said brake cylinder during the presence of pulses of said pressure increase pulse trains while fluid is not conducted form said brake cylinder to increase pressure in said brake cylinder during the presence of said pulses of said pressure increase pulse trains, each of said pressure increase pulse trains having:
(1) a first pulse having a duration which is variable, and
(2) succeeding pulses having fixed durations and fixed spacings between said succeeding pulses;

and means for controlling the durations, numbers, and spacings of said pulses of said pressure increase pulse trains according to the following:
(a) for an initial pressure increase pulse train, dependent upon that pressure decrease preceding said initial pressure increase pulse train,
(b) for a particular pressure increase pulse train following said initial pressure increase pulse train, dependent upon that pressure increase preceding said particular pressure increase pulse train,
(c) at an approximately constant coefficient of friction and at an approximately constant static pressure, said locking limit of said wheel is reached after a predetermined period of time.

10. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:
(a) a locking limit at which said wheel tends to lock, and
(b) acceleration of said wheel;

means adapted for supplying:
(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and
(b) pressure increase pulse trains having a frequency between 3 Hz and 10 Hz to said inlet and outlet valve means to repetitively conduct fluid to said brake cylinder during the presence of pulses of said pressure increase pulse trains while fluid is not conducted form said brake cylinder to increase pressure in said brake cylinder during the presence of said pulses of said pressure increase pulse trains, each of said pressure increase pulse trains having:
(1) a first pulse having a duration which is variable, and
(2) succeeding pulses having fixed durations and fixed spacings between said succeeding pulses;

and means for controlling the durations, numbers, and spacings of said pulses of said pressure increase pulse trains according to the following:
(a) for an initial pressure increase pulse train, dependent upon that pressure decrease preceding said initial pressure increase pulse train,
(b) for a particular pressure increase pulse train following said initial pressure increase pulse train, dependent upon that pressure increase preceding said particular pressure increase pulse train,
(c) at an approximately constant coefficient of friction and at an approximately constant static pressure, said locking limit of said wheel is reached after a predetermined number of pulses of said pressure increase pulse trains.

11. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:
(a) a locking limit at which said wheel tends to lock, and
(b) acceleration of said wheel;

means adapted for supplying:
(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and
(b) pressure increase pulse trains having a frequency between 3 Hz and 10 Hz to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having:
(1) a first pulse having a duration which is variable, and
(2) succeeding pulses having fixed durations and spacings between said succeeding pulses proportional to said duration of said first pulse of said pressure increase pulse trains;

and means for controlling the durations, numbers, and spacings of said pulses of said pressure increase pulse trains according to the following:
(a) for an initial pressure increase pulse train, dependent upon that pressure decrease preceding said initial pressure increase pulse train,
(b) for a particular pressure increase pulse train following said initial pressure increase pulse train, dependent upon that pressure increase preceding said particular pressure increase pulse train,
(c) at an approximately constant coefficient of friction and at an approximately constant static pressure, said locking limit of said wheel is reached after a predetermined period of time.

12. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:
(a) a locking limit at which said wheel tends to lock, and
(b) acceleration of said wheel;

means adapted for supplying:
(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and (b) pressure increase pulse trains having a frequency between 3 Hz and 10 Hz to said inlet and outlet valve means to repetitively conduct fluid to said brake cylinder during the presence of pulses of said pressure increase pulse trains while fluid is not conducted form said brake cylinder to increase pressure in said brake cylinder during the presence of said pulses of said pressure increase pulse trains, each of said pressure increase pulse trains having:

(1) a first pulse having a duration which is variable, and (2) succeeding pulses having fixed durations and spacings between said succeeding pulses proportional to said duration of said first pulse of said pressure increase pulse trains;

and means for controlling the durations, numbers, and spacings of said pulses of said pressure increase pulse trains according to the following:

(a) for an initial pressure increase pulse train, dependent upon that pressure decrease preceding said initial pressure increase pulse train, (b) for a particular pressure increase pulse train following said initial pressure increase pulse train, dependent upon that pressure increase preceding said particular pressure increase pulse train, and (c) at an approximately constant coefficient of friction and at an approxiamtley constant static pressure, said locking limit of said wheel is reached after a predetermined number of pulses of said pressure increase pulse trains.

13. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:

(a) a locking limit at which said wheel tends to lock, and (b) acceleration of said wheel;

means adapted for supplying:

(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and (b) pressure increase pulse trains to said inlet and outlet valve means to repetitively conduct fluid to said brake cylinder during the presence of pulses of said pressure increase pulse trains while fluid is not conducted form said brake cylinder to increase pressure in said brake cylinder during the presence of said pulses of said pressure increase pulse trains, each of said pressure increase pulse trains having a first pulse and succeeding pulses;

and means for controlling the durations, numbers, and spacings of said pulses of said pressure increase pulse trains according to the following:

(a) for an initial pressure increase pulse train, dependent upon that pressure decrease preceding said initial pressure increase pulse train, (b) for a particular pressure increase pulse train following said initial pressure increase pulse train, dependent upon that pressure increase preceding said particular pressure increase pulse train, (c) each said first pulse of said pressure increase pulse trains having a duration which is dependent upon a previously measured acceleration of said wheel once said acceleration exceeds a predetermined threshold value, and (d) at an approximately constant coefficient of friction and at an approximately constant static pressure, said locking limit of said wheel is reached after a predetermined period of time.

14. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:

(a) a locking limit at which said wheel tends to lock, and (b) acceleration of said wheel;

means adapted for supplying:

(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and (b) pressure increase pulse trains to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having a first pulse and succeeding pulses;

and means for controlling the durations, numbers, and spacings of said pulses of said pressure increase pulse trains according to the following:

(a) for an initial pressure increase pulse train, dependent upon that pressure decrease preceding said initial pressure increase pulse train, (b) for a particular pressure increase pulse train following said initial pressure increase pulse train, dependent upon that pressure increase preceding said particular pressure increase pulse train, (c) each said first pulse of said pressure increase pulse trains having a duration which is dependent upon a previously measured acceleration of said wheel once said acceleration exceeds a predetermined threshold value, and (d) at an approximately constant coefficient of friction and at an approxiamtley constant static pressure, said locking limit of said wheel is reached after a predetermined number of pulses of said pressure increase pulse trains.

15. A circuit for controlling an anti-lock braking system in which pressure in a brake cylinder associated with a wheel to be braked is controlled by inlet and outlet valves in conduits leading to and from the brake cylinder, said circuit comprising:

means adapted for sensing the rotational behavior of said wheel to be braked and for detecting:

(a) a locking limit at which said wheel tends to lock, and (b) acceleration of said wheel;
means adapted for supplying:
(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and
(b) pressure increase pulse trains to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having a first pulse and succeeding pulses;
and means for controlling the durations, numbers, and spacings of said pulses of said pressure increase pulse trains according to the following:
(a) for an initial pressure increase pulse train, dependent upon that pressure decrease preceding said initial pressure increase pulse train,
(b) for a particular pressure increase pulse train following said initial pressure increase pulse train, dependent upon that pressure increase preceding said particular pressure increase pulse train, and
(c) at an approximately constant coefficient of friction and at an approximately constant static pressure, said locking limit of said wheel is reached after a predetermined period of time; and
means for initiating pressure increase once acceleration exceeds a predetermined threshold value between 10 g and 20 g if the duration of said preceding pressure decrease was extended and above a predetermined threshold value.

16. A circuit for controlling an anti-lock braking system in which pressure in a brake cylinder associated with a wheel to be braked is controlled by inlet and outlet valves in conduits leading to and from the brake cylinder, said circuit comprising:
means adapted for sensing the rotational behavior of said wheel to be braked and for detecting:
(a) a locking limit at which said wheel tends to lock, and
(b) acceleration of said wheel;
means adapted for supplying:
(a) pressure decrease pulses to said inlet and outlet valve means in conduits leading to and from said brake cylinder associated with said wheel to conduct fluid from said brake cylinder during the presence of said pressure decrease pulses while fluid is not conducted to said brake cylinder to decrease pressure in said brake cylinder during the presence of said pressure decrease pulses, and
(b) pressure increase pulse trains to said inlet and outlet valve means to repetitively conduct fluid to said brake cylinder during the presence of pulses of said pressure increase pulse trains while fluid is not conducted from said brake cylinder to increase pressure in said brake cylinder during the presence of said pulses of said pressure increase pulse trains, each of said pressure increase pulse trains having a first pulse and succeeding pulses;
and means for controlling the durations, numbers, and spacings of said pulses of said pressure increase pulse trains according to the following:
(a) for an initial pressure increase pulse train, dependent upon that pressure decrease preceding said initial pressure increase pulse train,
(b) for a particular pressure increase pulse train following said initial pressure increase pulse train, dependent upon that pressure increase preceding said particular pressure increase pulse train, and
(c) at an approximately constant coefficient of friction and at an approximately constant static pressure, said locking limit of said wheel is reached after a predetermined number of pulses of said pressure increase pulse trains; and
means for initiating pressure increase once acceleration exceeds a predetermined threshold value between 10 g and 20 g if the duration of said preceding pressure decrease was extended and above a predetermined threshold value.

* * * * *

UNITED STATES PATENT AND TRADEMARK OFFICE
CERTIFICATE OF CORRECTION

PATENT NO. : 5,265,947

DATED : November 30, 1993

INVENTOR(S) : Hans Wupper, Helmut Fennel, Gunther Buschmann, Ivica Batistic, Norbert Ehmer, Robert Schmidt It is certified that error appears in the above—identified patent and that said Letters Patent is hereby corrected as shown below:

Claim 5, column 7, line 41, delete "baking" and substitute therefor --braking--

Claim 9, column 9, line 1, delete "form" and substitute therefor --from--

Claim 10, column 9, line 48, delete "form" and substitute therefor --from--

Claim 12, column 11, line 8, delete "form" and substitute therefor --from--

Claim 12, column 11, line 29, delete "approxiamtley" and substitute therefor --approximately--

Claim 13, column 11, line 56, delete "form" and substitute therefor --from--

UNITED STATES PATENT AND TRADEMARK OFFICE
CERTIFICATE OF CORRECTION

PATENT NO. : 5,265,947
DATED : November 30, 1993
INVENTOR(S) : Hans Wupper, et al.

It is certified that error appears in the above-indentified patent and that said Letters Patent is hereby corrected as shown below:

Claim 14, column 12, line 56, delete "approxiamtley" and insert --approximately--.

Signed and Sealed this

Twenty-eighth Day of June, 1994

Attest:

BRUCE LEHMAN

*Attesting Officer*   *Commissioner of Patents and Trademarks*